(12) United States Patent
Ha et al.

(10) Patent No.: US 10,891,566 B2
(45) Date of Patent: Jan. 12, 2021

(54) MANAGING MATERIAL DELIVERY PRODUCTIVITY

(71) Applicant: Caterpillar Inc., Deerfield, IL (US)

(72) Inventors: Chris Ha, Champaign, IL (US); Chau Le, Urbana, IL (US); Tony Metzger, Congerville, IL (US)

(73) Assignee: Caterpillar Inc., Peoria, IL (US)

( * ) Notice: Subject to any disclaimer, the term of this patent is extended or adjusted under 35 U.S.C. 154(b) by 233 days.

(21) Appl. No.: 16/000,078

(22) Filed: Jun. 5, 2018

(65) Prior Publication Data
US 2019/0370726 A1 Dec. 5, 2019

(51) Int. Cl.
*G06Q 10/06* (2012.01)
*G01C 21/36* (2006.01)
*G06F 3/0488* (2013.01)
*H04W 4/021* (2018.01)

(52) U.S. Cl.
CPC . *G06Q 10/063114* (2013.01); *G01C 21/3682* (2013.01); *G06F 3/04883* (2013.01); *H04W 4/021* (2013.01)

(58) Field of Classification Search
CPC ........ G06Q 10/063114; G01C 21/3682; G06F 3/04883; H04W 4/021
See application file for complete search history.

(56) References Cited

U.S. PATENT DOCUMENTS

| | | | |
|---|---|---|---|
| 6,421,586 B1 * | 7/2002 | Nicotera | G06Q 10/08 701/1 |
| 7,894,961 B2 * | 2/2011 | Blackburn | G07C 5/085 701/50 |
| 8,983,497 B2 | 3/2015 | Ziskind et al. | |
| 9,456,302 B2 | 9/2016 | Skomra et al. | |
| 9,811,949 B2 | 11/2017 | Baliew et al. | |
| 2008/0084333 A1 * | 4/2008 | Forrest | G06Q 10/06 340/989 |
| 2010/0042940 A1 | 2/2010 | Monday et al. | |
| 2010/0312599 A1 | 12/2010 | Durst | |
| 2013/0035978 A1 * | 2/2013 | Richardson | G06Q 10/087 705/7.27 |
| 2015/0269685 A1 | 9/2015 | Takeda | |
| 2016/0048795 A1 | 2/2016 | Walton | |
| 2016/0100002 A1 * | 4/2016 | Dimonte | H04L 51/24 709/203 |
| 2017/0132547 A1 | 5/2017 | Myers | |
| 2018/0081368 A1 * | 3/2018 | Watanabe | B62D 15/0265 |
| 2018/0088591 A1 * | 3/2018 | Friend | E02F 9/2054 |
| 2018/0251346 A1 * | 9/2018 | Thomson | B66C 13/06 |

* cited by examiner

Primary Examiner — Sujay Koneru
(74) Attorney, Agent, or Firm — Harrity & Harrity LLP

(57) ABSTRACT

A device for managing material delivery productivity is disclosed. The device may receive information identifying a job site, a load zone, a dump zone, a quantity of loads, and a material. The device may provide, to a user device associated with a machine, information indicating that the load zone, the dump zone, the quantity of loads, and the material are assigned to the machine, and may receive, over a time period, location information associated with the machine. The device may determine statuses of the machine over the time period and based on the location information, and may calculate a dump count of the material and a quantity of material delivery cycles, for the machine and at a particular time, based on the statuses of the machine. The device may perform an action based on the dump count of the material and the quantity of material delivery cycles.

20 Claims, 13 Drawing Sheets

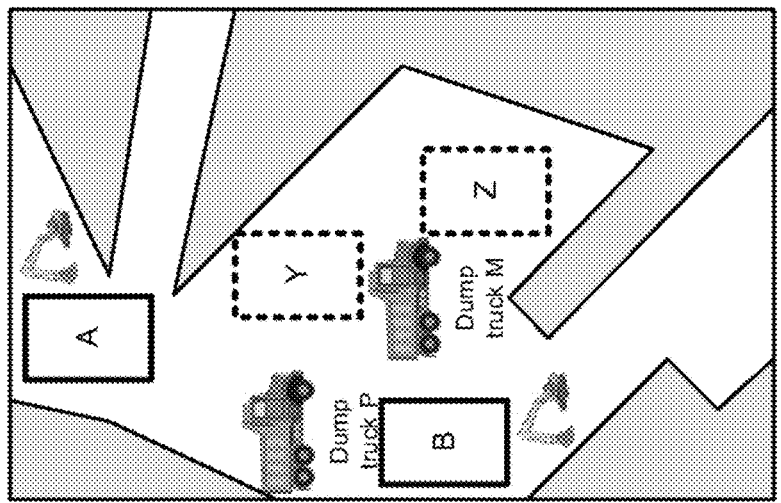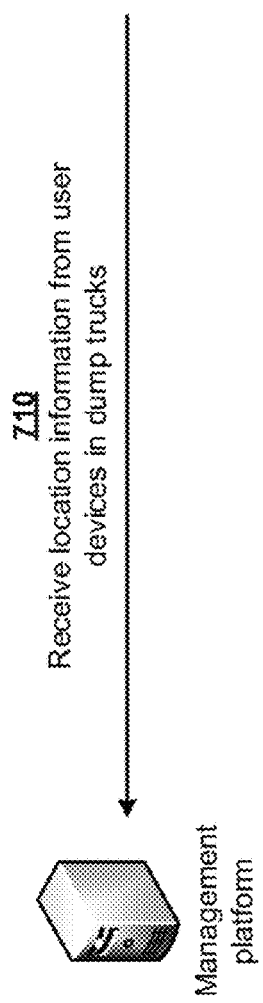
FIG. 7

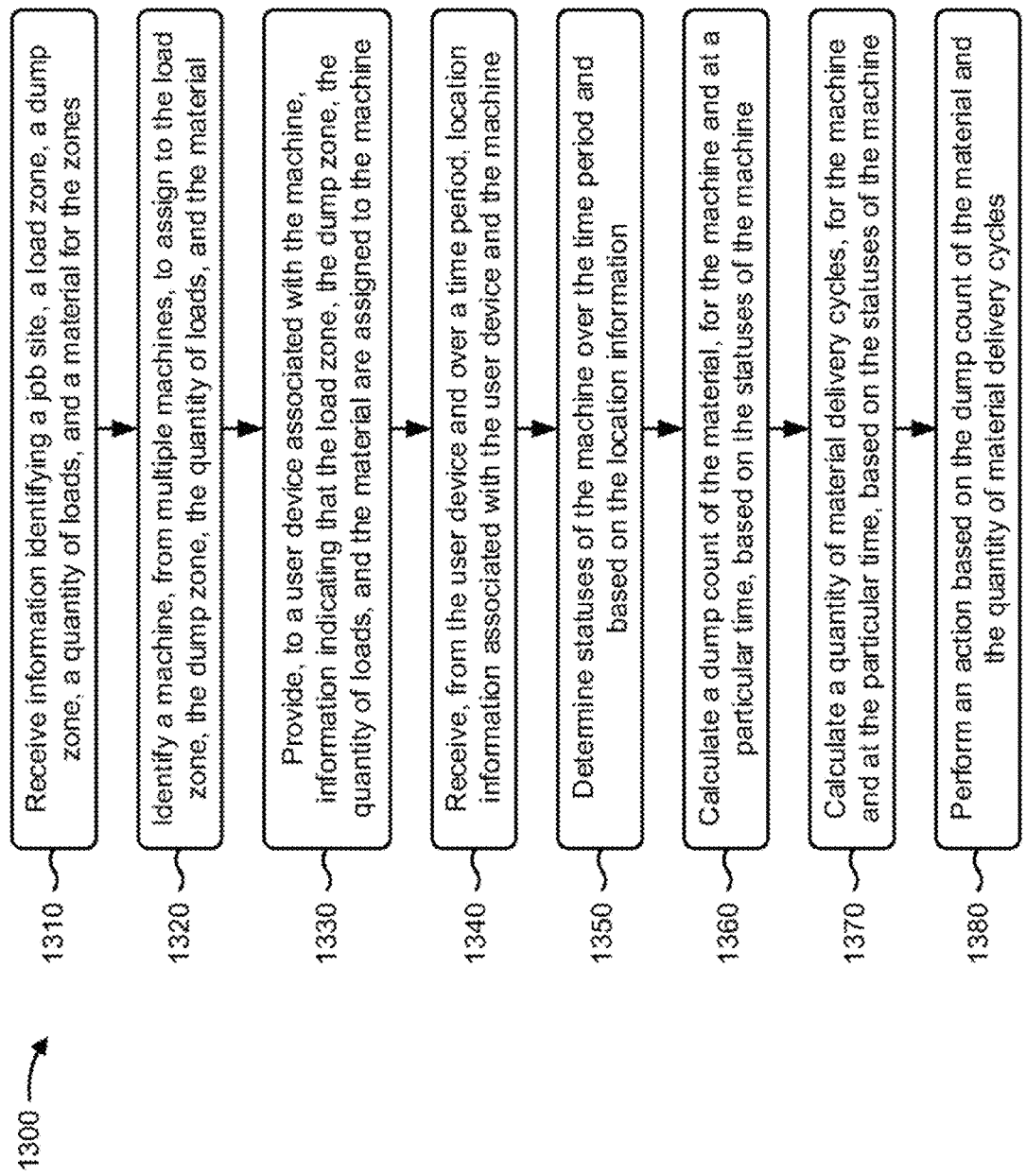

MANAGING MATERIAL DELIVERY PRODUCTIVITY

TECHNICAL FIELD

The present disclosure relates generally to material delivery, and, more particularly, to a management platform that manages material delivery productivity.

BACKGROUND

A construction job site may include multiple earth-moving machines, such as dump trucks, excavators, continuous miners, loaders, and/or the like, and responsible persons associated with different machines. The machines often engage with and/or move a variety of earthen materials from one location of a job site to another location of the job site or another job site. Operators of the machines may be compensated based on quantities of material loads delivered, moved, processed, and/or the like. The machines may also be tracked to determine the quantities of material loads and the productivity of the machines.

Conventional techniques for tracking machines and determining machine productivity include utilizing telemetry data provided by embedded or retrofit hardware attached to the machines at job sites. Such telemetry data may be used in an effort to improve earth-moving productivity. However, the embedded or retrofit hardware is expensive, and many job sites have complex material processing situations and/or utilize short-term, rented machines that do not have the embedded or retrofit hardware. As a result, the telemetry data received from the hardware may be incorrect or nonexistent, and determining machine productivity may require manual validation of the quantities of material loads.

One worksite system is disclosed in U.S. Patent Application Publication No. 2010/0312599 that published in the name of Durst on Dec. 9, 2010 ("the '599 patent publication"). In particular, the '599 patent publication discloses a worksite system for measuring productivity of a machine. The worksite system may generate a digital map of a worksite with geo-fences defined. Each different geo-fence may be marked and may demarcate a subsection of the area represented by the digital map. A machine may be represented on the digital map, and may not be inside or at a perimeter of any of the geo-fences. This information may be reported by the worksite system to a worksite manager and/or a machine operator and may be useful in helping to assess a productivity of the machine. The machine may include an interface control device that includes components for automatically gathering information from the machine during the operation of the machine. For example, the interface control device may include a locating device, an interface control module, and a controller for communicating with the worksite system.

While the worksite system of the '599 patent publication discloses defining geo-fences for a worksite and tracking information from the machine, the interface control device may be hardware that is embedded or retrofit into the machine. Furthermore, the interface control device may be expensive, complex, and difficult to operate for a machine operator. Thus, the interface control device may be incorrectly operated or may not be utilized at all by the machine operator.

The management platform of the present disclosure solves one or more of the problems set forth above and/or other problems in the art.

SUMMARY

In one aspect, the present disclosure is related to a device that includes one or more memory devices, and one or more processors, operatively coupled to the one or more memory devices, to receive information identifying a job site, a load zone of the job site, a dump zone of the job site, a quantity of loads, and a material associated with the load zone and the dump zone. The one or more processors may provide, to a user device associated with a machine, information indicating that the load zone, the dump zone, the quantity of loads, and the material are assigned to the machine, and may receive, from the user device and over a time period, location information associated with the user device and the machine. The one or more processors may determine statuses of the machine over the time period and based on the location information, and may calculate a dump count of the material, for the machine and at a particular time, based on the statuses of the machine. The one or more processors may calculate a quantity of material delivery cycles, for the machine and at the particular time, based on the statuses of the machine, and may perform an action based on the dump count of the material and the quantity of material delivery cycles.

In another aspect, the present disclosure is related to a non-transitory computer-readable medium storing instructions that include one or more instructions that, when executed by one or more processors of a device, cause the one or more processors to receive, from a first user device, information identifying the job site, a load zone of the job site, a dump zone of the job site, a quantity of loads, and a material associated with the load zone and the dump zone. The one or more instructions may cause the one or more processors to identify a machine, from multiple machines, to assign to the load zone, the dump zone, the quantity of loads, and the material, based on information associated with the multiple machines. The one or more instructions may cause the one or more processors to provide, to a second user device associated with the machine, and based on the information identifying the machine, information indicating that the load zone, the dump zone, the quantity of loads, and the material are assigned to the machine, and receive, from the second user device and over a time period, location information associated with the second user device and the machine. The one or more instructions may cause the one or more processors to determine statuses of the machine over the time period and based on the location information, and calculate a dump count of the material, for the machine and at a particular time, based on the statuses of the machine. The one or more instructions may cause the one or more processors to calculate a quantity of material delivery cycles, for the machine and at the particular time, based on the statuses of the machine, and perform an action based on the dump count of the material and the quantity of material delivery cycles.

In yet another aspect, the present disclosure is related to a method that includes receiving, by a device, information identifying a job site, a load zone of the job site, a dump zone of the job site, a quantity of loads, and a material associated with the load zone and the dump zone. The method may include identifying, by the device, a machine from multiple machines available for the job site, based on information about the multiple machines, information about drivers of the multiple machines, information about a geographical area in which the load zone and the dump zone are located, or information about a condition associated with the geographical area. The method may include providing, by the device and to a user device associated with the machine, information indicating that the load zone, the dump zone, the quantity of loads, and the material are assigned to the machine, and receiving, by the device, from the user device, and over a time period, location information associated with the user device and the machine. The method may include determining, by the device, statuses of the machine over the time period and based on the location information, and calculating, by the device, a dump count of the material, for the machine and at a particular time, based on the statuses of the machine. The method may include performing, by the device, an action based on the dump count of the material.

BRIEF DESCRIPTION OF THE DRAWINGS

FIGS. 1-10 are diagrams of example implementations described herein;

FIG. 13 is a flow chart of an example process for managing material delivery productivity.

DETAILED DESCRIPTION

This disclosure relates to a management platform that manages material delivery productivity. The management platform has universal applicability to any machine that handles earthen materials, such as a dump trucks, a bulldozer, an excavator, a continuous miner, a loader, and/or the like.

FIGS. 1-10 are diagrams of example implementations described herein. As shown in example implementation 100 of FIG. 1, a first user device may be associated with a machine operator, a second user device may be associated with a site foreman, and the user devices may be associated with a management platform. As further shown in FIG. 1, and by reference number 110, the management platform may provide a material management application to the first user device and the second user device. In some implementations, the first user device and/or the second user device may request the material management application from the management platform, and may download the material management application from the management platform (e.g., with approval of the management platform). In some implementations, the material management application may include an application that enables management of material delivery productivity, site planning, visualization of analytics results, monitoring of a job site, and/or the like (e.g., by the management platform, the machine operator, the site foreman, and/or the like).

In some implementations, the machine operator and the site foreman may install the material management application on the first user device and the second user device, respectively, and may provide user settings for the material management application. In some implementations, the user settings may include information indicating a user name (e.g., Pam for the machine operator and Joe for the site foreman), a title of the user (e.g., driver and foreman), a password for the application, whether the user wishes to work at particular job sites, whether the user wishes work on particular days or at particular times, whether the user prefers to work with particular materials, whether the user wishes to receive alerts associated with the job site, whether the user wishes to receive material delivery productivity data, a calendar of the user, user information (e.g., years of experience, experience on similar jobs, ratings, when the user last worked, etc.), machine information (e.g., where the machine is located, an age of the machine, a maintenance record of the machine, a future scheduled maintenance or repair for the machine, how many miles are on the machine, how many miles are on tires and/or tread on the machine), and/or the like. As further shown in FIG. 1, and by reference number 120, the management platform may receive the user settings from the first user device and the second user device, and may store the user settings in a memory associated with the management platform.

Figure 1:
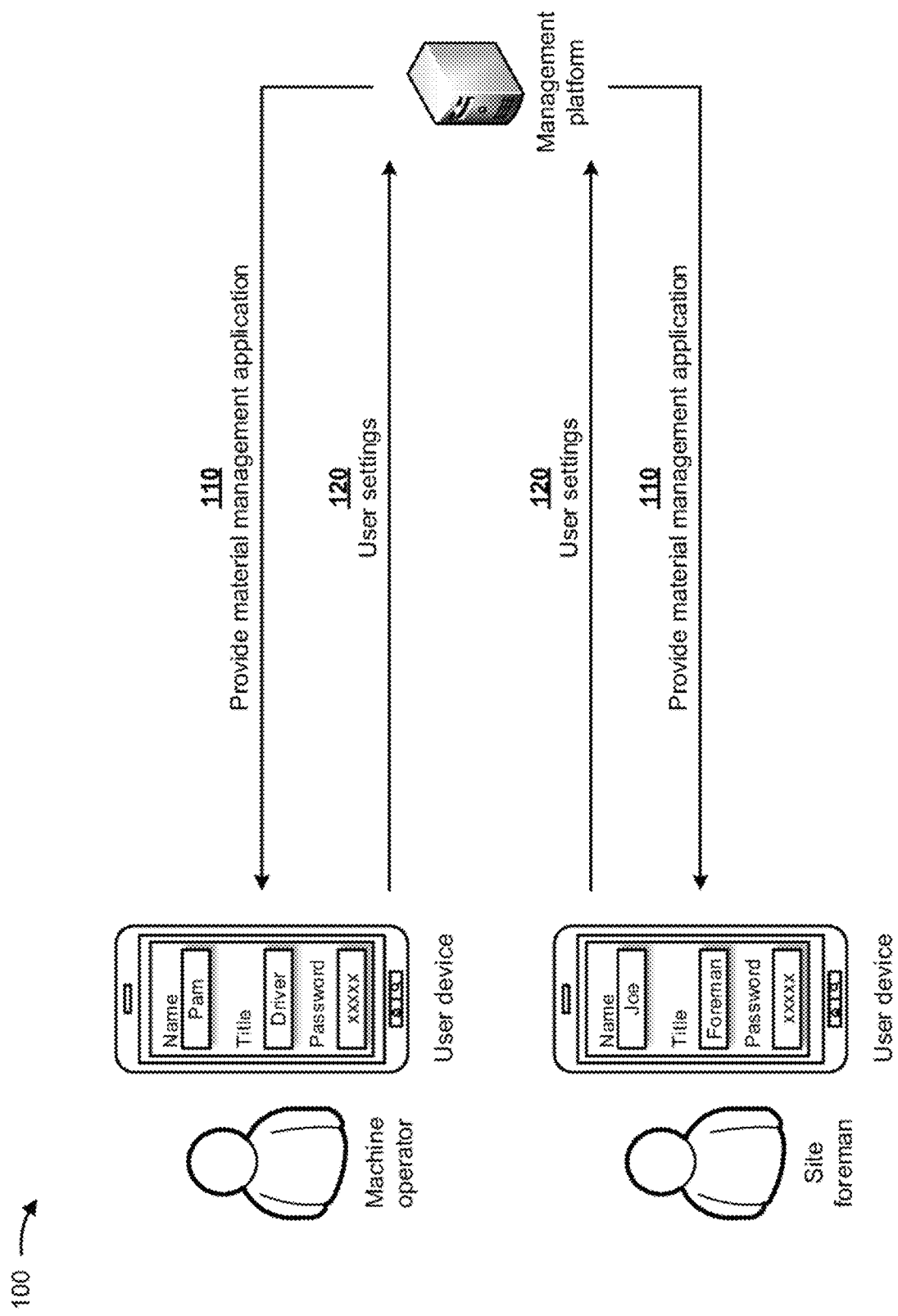
Figure 2:
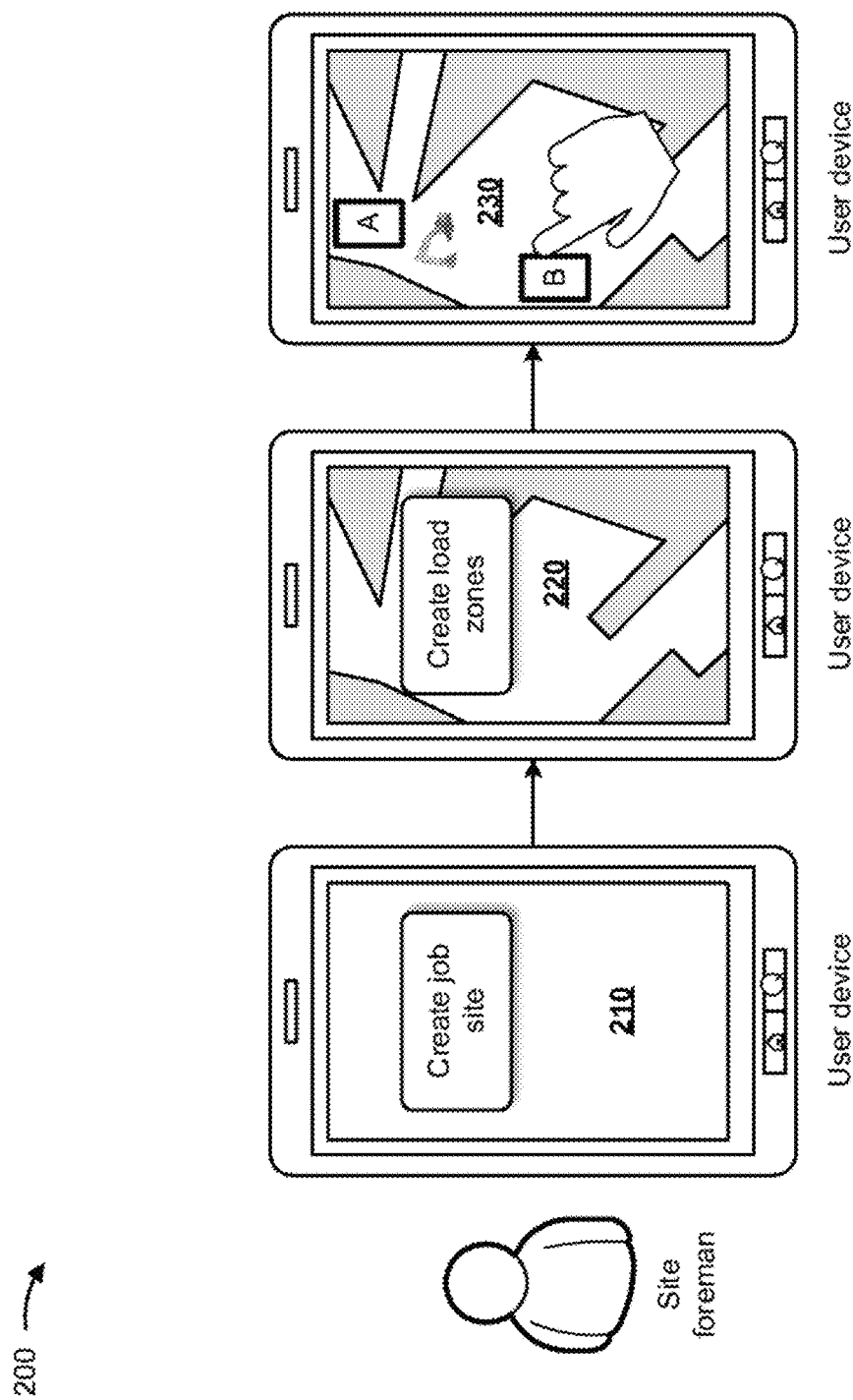

As shown in example implementation 200 of FIG. 2, the site foreman may utilize the material management application, via the user device, to manage a job site. For example, as shown by reference number 210, the user device may provide for display, to the site foreman, a user interface that enables the site foreman to create a job site. In some implementations, the site foreman may utilize the user interface to retrieve (e.g., from a memory of the user device or from another source) a visual rendering of the job site. The visual rendering of the job site may include a satellite image, a topographical map, a topological map, a dot map, a road map, a hybrid map, and/or the like of the job site.

As further shown in FIG. 2, and by reference number 220, the user device may provide for display, to the site foreman, a user interface that provides the visual rendering of the job site and enables the site foreman to create load zones (e.g., zones where a machine loads a material for hauling) for the job site. As further shown in FIG. 2, and by reference number 230, the user device may provide for display, to the site foreman, a user interface that enables the site foreman to define the load zones via the visual rendering of the job site. In some implementations, to create load zones (e.g., load zones A and B), the site foreman may utilize a finger or a stylus with the user interface to create multi-polygon geographical boundaries or geo-fences that represent the load zones. In such implementations, the site foreman may utilize the finger or the stylus to tap a particular quantity of corners for a polygon that represents a load zone. In some implementations, the site foreman need not create load zones, and the load zones may be automatically defined by a location of a machine that performs the loading (e.g., an excavator, a loader, and/or the like). In such implementations, the management platform may track the location of the loading machine (e.g., via a user device associated with the loading machine), and may assign a load zone to the location of the loading machine. The location of load zone, in such implementations, may change as the loading machine moves around the job site.

Figure 3:
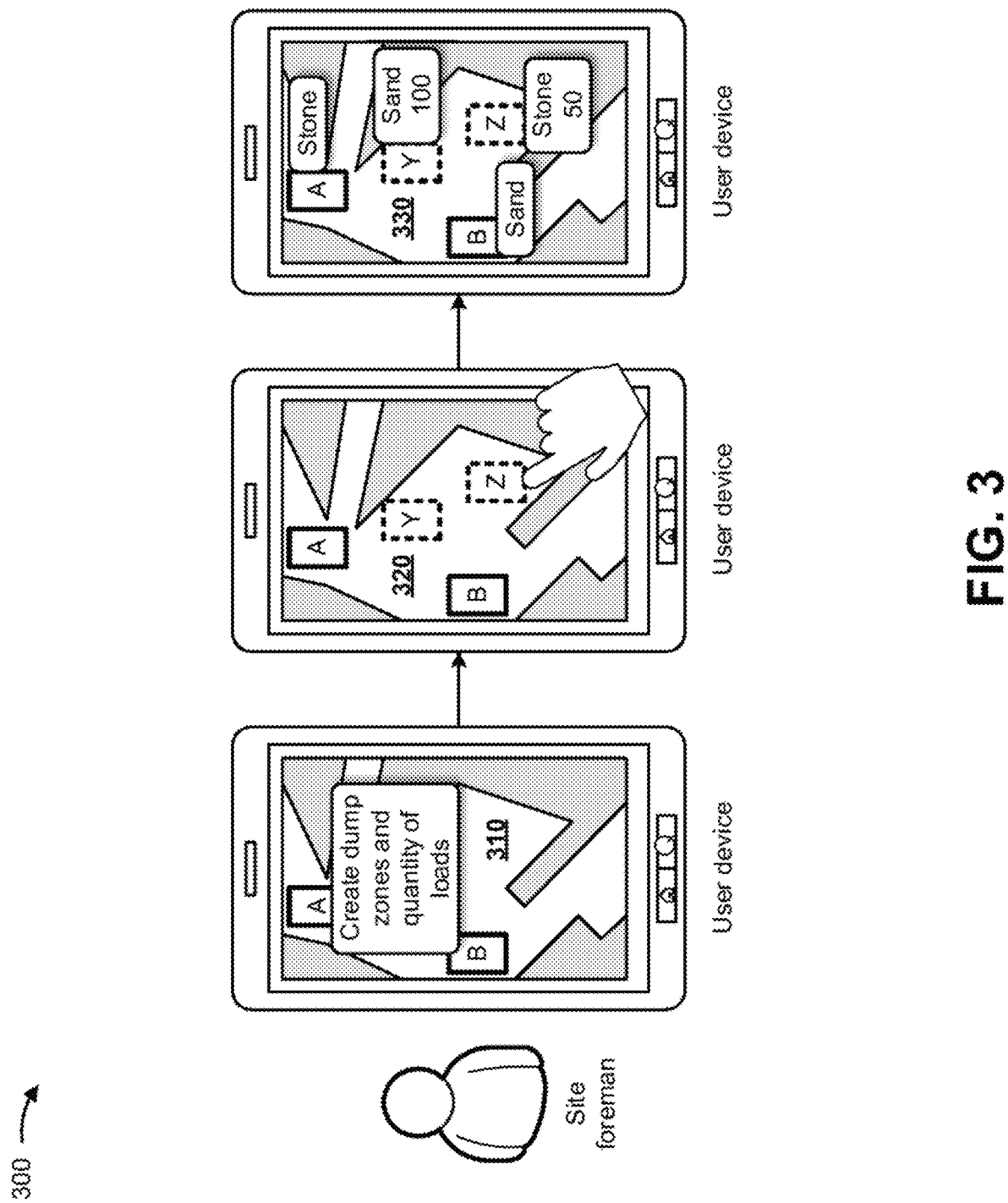

As shown in example implementation 300 of FIG. 3, and by reference number 310, the user device may provide for display, to the site foreman, a user interface that provides the visual rendering of the job site and enables the site foreman to create dump zones for the job site and a quantity of loads associated with the job site. As further shown in FIG. 3, and by reference number 320, the user device may provide for display, to the site foreman, a user interface that enables the site foreman to define the dump zones via the visual rendering of the job site. In some implementations, to create dump zones (e.g., dump zones Y and Z), the site foreman may utilize a finger or a stylus with the user interface to create multi-polygon geographical boundaries or geo-fences that represent the dump zones. In such implementations, the site foreman may utilize the finger or the stylus to tap a particular quantity of corners for a polygon that represents a dump zone.

As further shown in FIG. 3, and by reference number 330, the user device may provide for display, to the site foreman, a user interface that enables the site foreman to define materials for the load zones and the dump zones, and a quantity of loads for dumping at the dump zones. For example, the site foreman may indicate, via the user interface, that load zone A includes stone as a material and that load zone B includes sand as a material. The site foreman may also indicate, via the user interface, that one-hundred (100) loads of sand, from load zone A, are to be dumped at dump zone Y, and that fifty (50) loads of stone, from load zone B, are to be dumped at dump zone Z. In some implementations, the site foreman may continue to utilize the material management application to define other job sites, load zones, dump zones, materials, quantity of loads, and/or the like.

Figure 4:
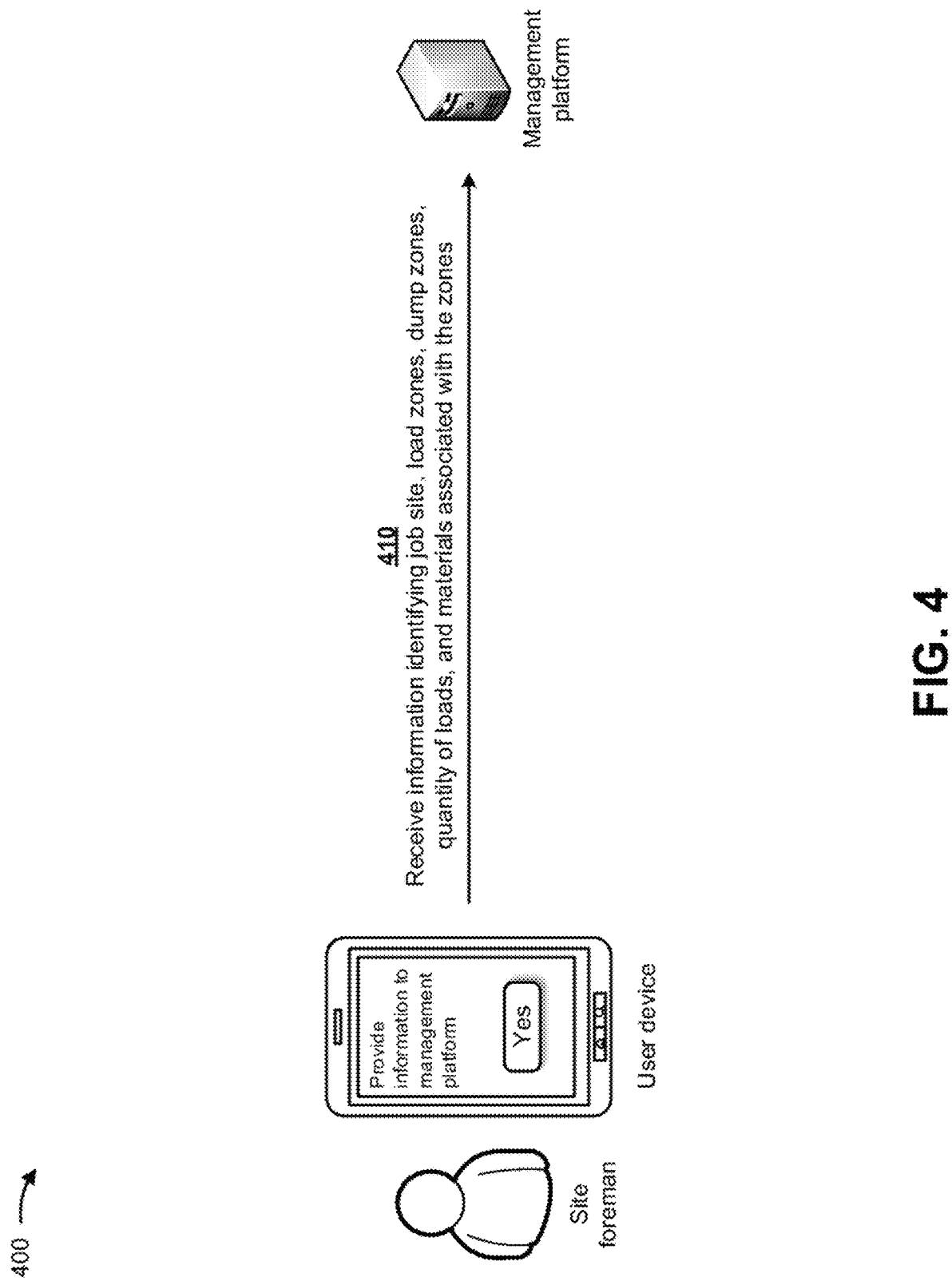

As shown in example implementation 400 of FIG. 4, and by reference number 410, the management platform may receive information identifying the job site, the load zones, the dump zones, the quantity of loads, and the materials associated with the zones. In some implementations, when the site foreman has provided all of the information for the job site, the user device may provide an option to provide the information to the management platform. When the site foreman selects the option, the selection of the option may cause the user device to provide, to the management platform, the information identifying the job site, the load zones, the dump zones, the quantity of loads, and the materials associated with the zones. In some implementations, the management platform may store the information identifying the job site, the load zones, the dump zones, the quantity of loads, and the materials associated with the zones in a memory associated with the management platform.

Figure 5:
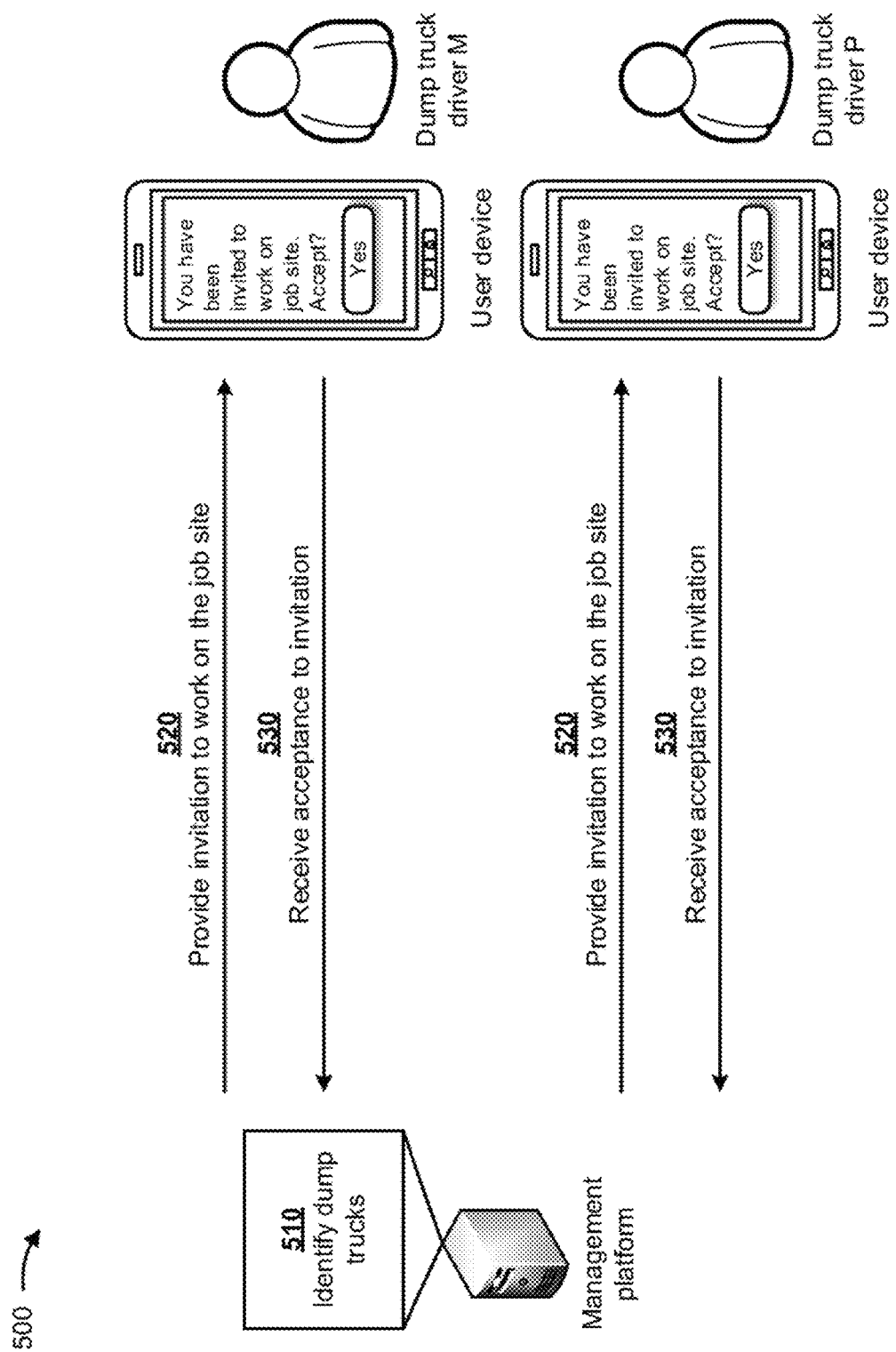

As shown in example implementation 500 of FIG. 5, and by reference number 510, the management platform may identify one or more machines (e.g., dump trucks), from multiple machines available for the job site, to assign to the job site (e.g., for loading, hauling, and dumping materials). In some implementations, the management platform may utilize a variety of information (e.g., associated with the multiple machines) to identify or select the one or more machines from the multiple machines. For example, the management platform may utilize machine operator information (e.g., years of experience, experience on similar jobs, ratings, when the machine operators last worked, etc.), where machines are located, ages of the machines, maintenance records of the machines, future scheduled maintenance or repair for the machines, how many miles are on the machines, how many miles are on tires and/or tracts of the machines, weather forecast information, geographical topography information for the job site (e.g., hills, valleys, flat, etc.), information about a condition associated with the job site (e.g., muddy, dusty, paved roads, etc.), and/or the like.

In some implementations, the management platform may assign weights to the variety of information used to identify the one or more machines, and may determine scores for the multiple machines based on the weights. The management platform may assign ranks to the multiple machines based on the scores, and may identify the one or more machines based on the ranks of the multiple machines. For example, if the job site requires five dump trucks, the management platform may identify five dump trucks with the highest ranks for the job site.

As further shown in FIG. 5, and by reference number 520, once the management platform identifies the one or more machines (e.g., dump trucks), the management platform may provide invitations, to work on the job site, to user devices associated with the one or more machines. For example, the management platform may provide an invitation, to work on the job site, to a user device associated with dump truck driver M, another invitation, to work on the job site, to a user device associated with dump truck driver P, and/or the like.

The user devices may receive the invitations, and may provide for display user interfaces indicating the invitation to work on the job site. The user interfaces may also enable dump truck driver M and dump truck driver P to accept the invitations to work on the job site, which may cause the user devices to provide acceptances to the management platform. As further shown in FIG. 5, and by reference number 530, if the dump truck drivers accept the invitations, the management platform may receive acceptances to the invitations from the user devices associated with dump truck driver M and dump truck driver P.

Figure 6:
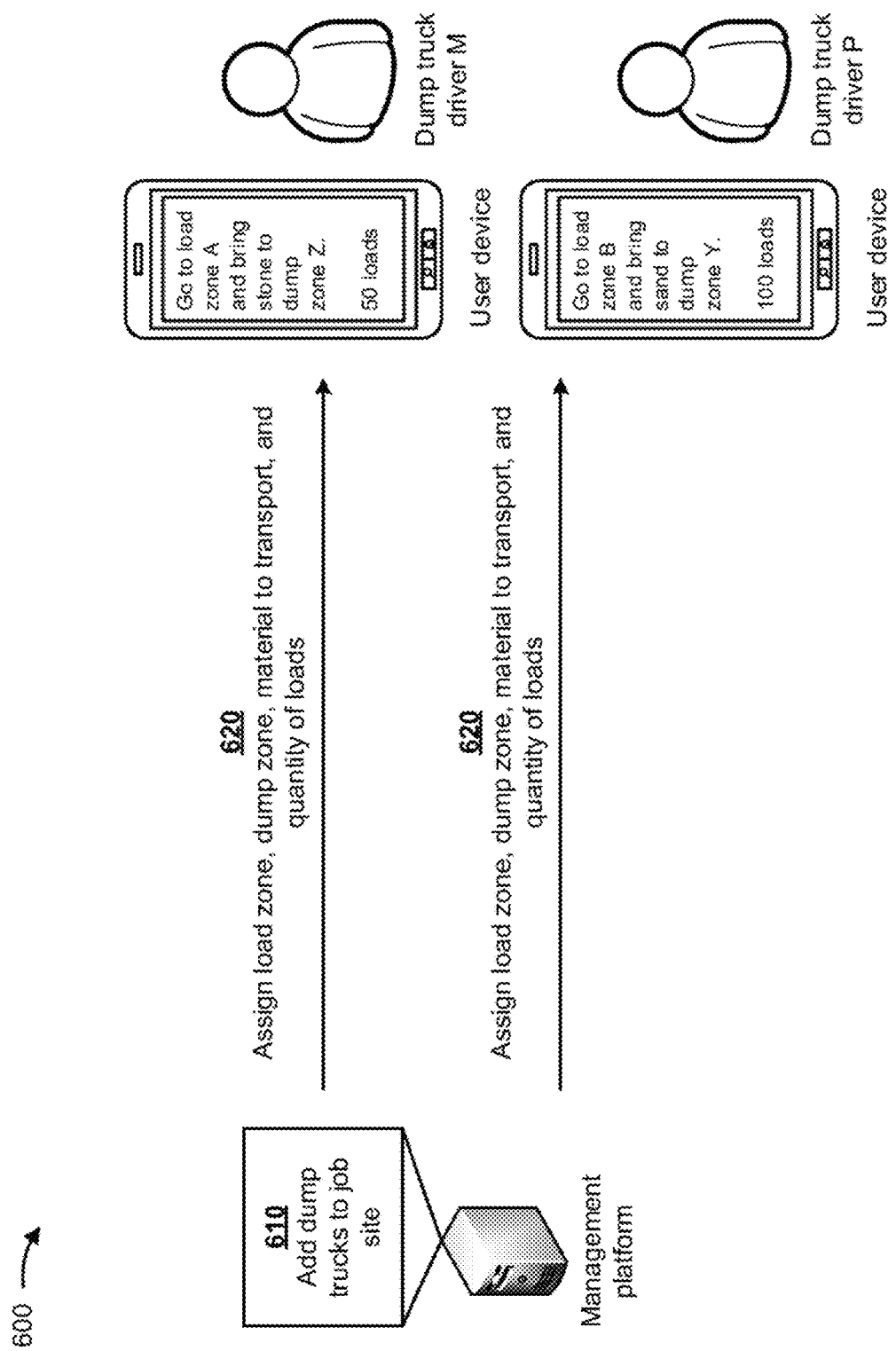

As shown in example implementation 600 of FIG. 6, and by reference number 610, the management platform may add the machines (e.g., the dump trucks) to the job site. In some implementations, by adding the dump trucks to the job site, the management platform may indicate that the dump trucks are available to perform work (e.g., loading, hauling, dumping, and/or the like) on the job site.

As further shown in FIG. 6, and by reference number 620, the management platform may provide assignments, associated with the job site, to user devices associated with the one or more machines. For example, the management platform may provide an assignment to the user device associated with dump truck driver M, another assignment to the user device associated with dump truck driver P, and/or the like. In some implementations, each assignment may include information indicating that a load zone, a dump zone, a quantity of loads, and a material are assigned to the machine (e.g., the dump truck). In some implementations, the user device may provide for display (e.g., via a user interface) the information included in the assignments. For example, the user device for dump truck driver M may indicate that dump truck driver M is to retrieve fifty (50) loads of stone from load zone A, haul the stone to dump zone Z, and dump the stone at dump zone Z. In another example, the user device for dump truck driver P may indicate that dump truck driver P is to retrieve one-hundred (100) loads of sand from load zone B, haul the sand to dump zone Y, and dump the sand at dump zone Y.

In some implementations, the assignments may include navigation information that provides directions to and from load zones and dump zones associated with different machines. For example, the assignment may cause the user device associated with dump truck driver M to provide navigation information to and from load zone A and dump zone Z. In another example, the assignment may cause the user device associated with dump truck driver P to provide navigation information to and from load zone B and dump zone Y.

In some implementations, if a machine is an autonomous vehicle, the management platform may provide an assignment to the machine, and the assignment may include instructions for performing tasks on the job site. For example, if the machine is an autonomous dump truck, the management platform may provide, to the dump truck, instructions that cause the dump truck to load material from a load zone, haul the material to a dump zone, dump the material at the dump zone, and repeat the aforementioned steps.

As shown in example implementation 700 of FIG. 7, and by reference number 710, the management platform may receive, from user devices associated with the machines and over a time period (e.g., in minutes, hours, days, weeks, etc.), location information associated with the user devices and the machines. In some implementations, the location information for the machines may be the same as associated user devices since the user devices may be physically provided in the machines. In some implementations, the management platform may continuously track locations of all machines working on the job site based on locations (e.g., global positioning system (GPS) coordinates) of the user devices provided in the machines. Since many of the machines (e.g., dump trucks) on the job site move around the job site, the management platform may continuously track current locations of such machines. In some implementations, the machines may include sensors (e.g., that communicate with the management platform and/or user devices) that provide information indicating how many times a dump truck received a load, how many times a dump truck dumps a load, how many times an excavator bucket engages the ground, is filled, and is emptied, and/or the like.

For example, assume that user devices are provided in dump truck M, dump truck P, and excavators shown in FIG. 7. In such an example, the management platform may track the locations of dump truck M, dump truck P, and the excavators based on the locations of user devices provided in dump truck M, dump truck P, and the excavators. As shown, one excavator may be located near load zone A, dump truck P and the other excavator may be located near load zone B, and dump truck M may be located near dump zone Z, at a particular time. In some implementations, the management platform may store the location information associated with the user devices and the machines in a memory associated with the management platform.

Figure 8:
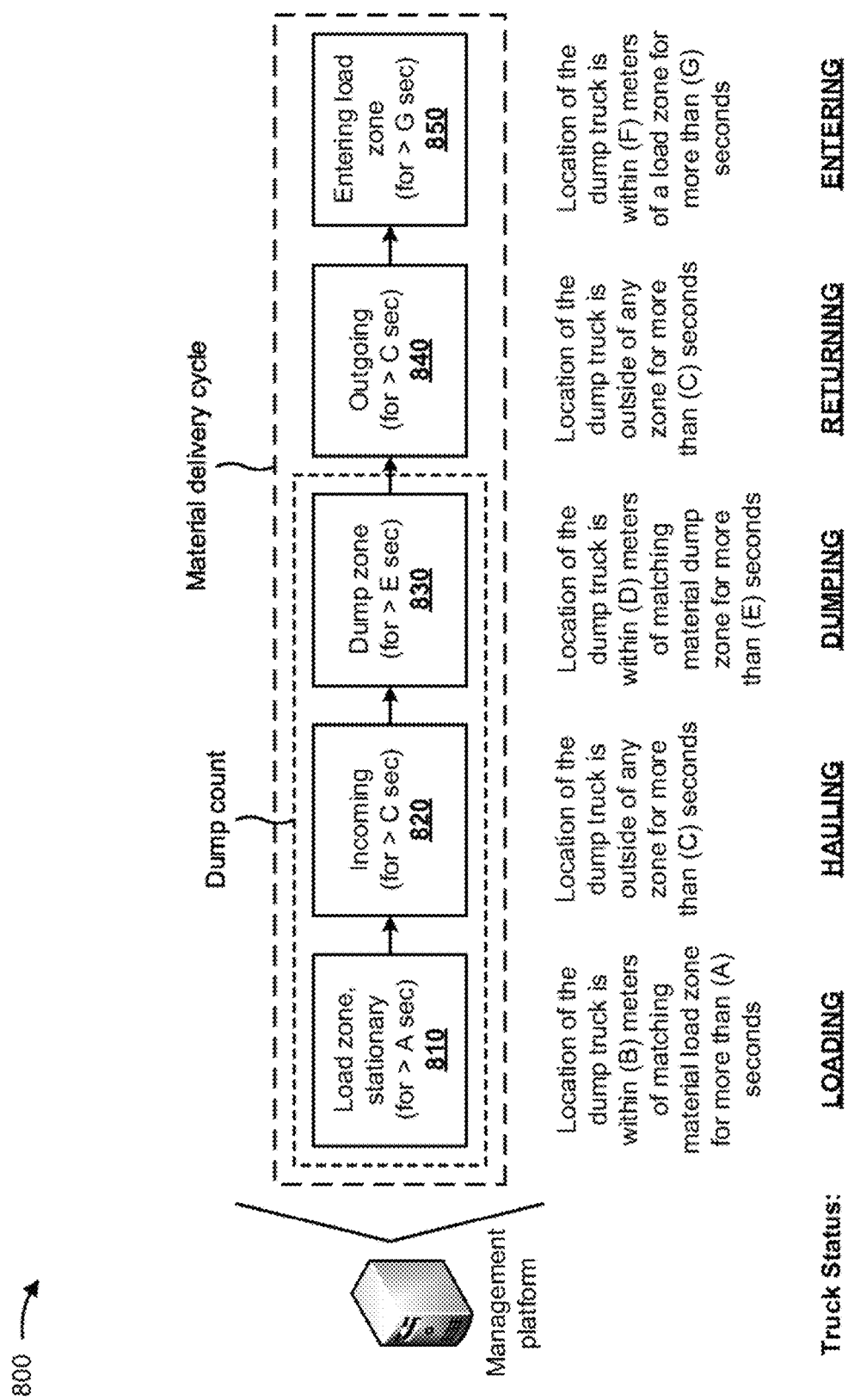

As shown in example implementation 800 of FIG. 8, the management platform may determine statuses of a machine (e.g., a dump truck) over the time period and based on the location information associated with the machine. In some implementations, and as indicated by reference number 810 in FIG. 8, the management platform may determine that the dump truck status is loading when the location of the dump truck is within a particular distance (e.g., B centimeters, meters, etc.) of a matching material load zone (e.g., a load zone that includes the material assigned to the dump truck) for more than a particular time period (e.g., A seconds, minutes, etc.). In some implementations, the dump truck may include sensors (e.g., communicating with the management platform and/or the user device) that provide information indicating whether the dump truck has received a load.

In some implementations, and as indicated by reference number 820 in FIG. 8, the management platform may determine that the dump truck status is hauling a load when the location of the dump truck is outside of any zone (e.g., load zones or dump zones) for more than a particular time period (e.g., C seconds, minutes, etc.).

In some implementations, and as indicated by reference number 830 in FIG. 8, the management platform may determine that the dump truck status is dumping a load when the location of the dump truck is within a particular distance (e.g., D centimeters, meters, etc.) of a matching material dump zone (e.g., a dump zone that includes the material assigned to the dump truck) for more than a particular time period (e.g., E seconds, minutes, etc.). In some implementations, the dump truck may include sensors (e.g., communicating with the management platform and/or the user device) that provide information indicating that the dump truck dumped a load.

In some implementations, and as indicated by reference number 840 in FIG. 8, the management platform may determine that the dump truck status is returning to a load zone after dumping a load when the location of the dump truck is outside of any zone (e.g., load zones or dump zones) for more than a particular time period (e.g., C seconds, minutes, etc.).

In some implementations, and as indicated by reference number 850 in FIG. 8, the management platform may determine that the dump truck status is entering the load zone again when the location of the dump truck is within a particular distance (e.g., F centimeters, meters, etc.) of the matching material load zone (e.g., a load zone that includes the material assigned to the dump truck) for more than a particular time period (e.g., G seconds, minutes, etc.).

In some implementations, the particular distance thresholds (e.g., B, D, and F) and the particular time period thresholds (e.g., A, C, E, and G) may be provided by an operator of the management platform. In some implementations, the particular distance thresholds (e.g., B, D, and F) and the particular time period thresholds (e.g., A, C, E, and G) may be determined by the management platform based on historical loading and dumping information associated with the job site. For example, the management platform may utilize the historical loading and dumping information to train a machine learning model to determine values for the particular distance thresholds and/or particular time period thresholds. In some implementations, the management platform may train the machine learning model (e.g., to generate a trained machine learning model) by providing the historical loading and dumping information (e.g., training data) to the machine learning model, and receiving predictions (e.g., indicating predicted events) based on providing the historical loading and dumping information to the machine learning model. Based on the predictions, the management platform may update the machine learning model, and may provide the historical loading and dumping information to the updated machine learning model. The management platform may repeat this process until correct predictions are generated by the machine learning model.

In some implementations, the machine learning model may include a supervised machine learning model, an unsupervised machine learning model, and/or the like. The supervised machine learning model may learn a function that maps an input to an output based on example input-output pairs. The machine learning model infers a function from labeled training data consisting of a set of training examples. Each example may be a pair consisting of an input object (typically a vector) and a desired output value (also called the supervisory signal). A supervised machine learning model may analyze the training data and produce an inferred function, which can be used for mapping new examples. In some implementations, an optimal scenario will allow for the supervised machine learning model to correctly determine class labels for unseen instances. In this case, correctly determining the class labels for unseen instances may require the supervised machine learning model to generalize from the training data to unseen situations in a reasonable way, such as through application of inductive bias.

In order to solve a given problem using a supervised machine learning model, a type of training example may first be determined, a training set may be gathered, an input feature representation of a learned function may be determined, the structure of the learned function and corresponding supervised machine learning model may be determined, the supervised machine learning model may be executed on the gathered training set, and the accuracy of the learned function may be evaluated. The supervised machine learning model may include a support vector machine, a linear regression model, a logistic regression model, a naive Bayes classifier, a linear discriminant analysis model, a decision tree, a k-nearest neighbor model, an artificial neural network, and/or the like.

The unsupervised machine learning model may infer a function to describe hidden structure from unlabeled data. Because the examples given to the learner are unlabeled, unlike supervised learning, there is no evaluation of an accuracy of structure that is output by the unsupervised machine learning model.

The unsupervised machine learning model may include a clustering model (e.g., a k-means clustering model, a mixture model, a hierarchical clustering model, and/or the like), an anomaly detection model, an artificial neural network (e.g., an autoencoder, a deep belief net, a Hebbian learning model, a generative adversarial network, a self-organizing map, and/or the like), a latent variable model (e.g., an expectation-maximization model, a method of moments model, a blind signal separation model), and/or the like.

In some implementations, the management platform may utilize one or more of the trained machine learning models, and may utilize the best results determined by one of the trained machine learning models. In some implementations, the management platform may utilize a plurality of the trained machine learning models, and may aggregate the results determined by the plurality of trained machine learning models.

As further shown in FIG. 8, the management platform may determine a dump count for the dump truck by adding a quantity of times that the dump truck includes consecutive loading, hauling, and dumping statuses (e.g., as indicated by reference numbers 810, 820, and 830) over the time period. As further shown in FIG. 8, the management platform may determine a quantity of material delivery cycles for the dump truck by adding a quantity of times that the dump truck includes consecutive loading, hauling, dumping, returning, and entering statuses (e.g., as indicated by reference numbers 810, 820, 830, 840, and 850) over the time period.

Figure 9:
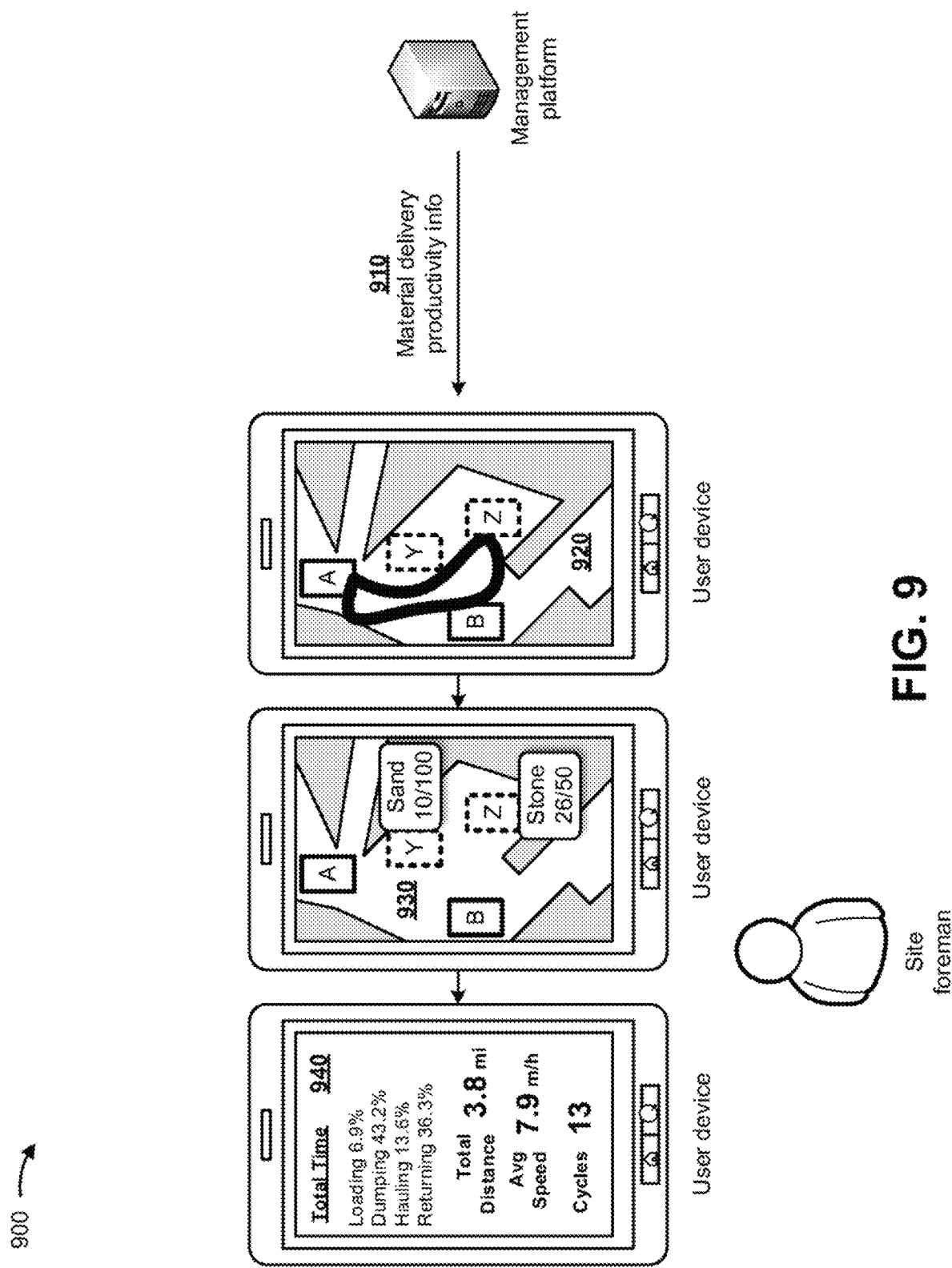

As shown in example implementation 900 of FIG. 9, and by reference number 910, the management platform may provide material delivery productivity information to the user device associated with the site foreman. In some implementations, the material delivery productivity information may include information indicating dump counts for dump trucks, quantities of material delivery cycles for dump trucks, routes traveled by dump trucks, distances traveled by dump trucks, average speeds of dump trucks, and/or the like. In some implementations, the dump truck may include sensors (e.g., communicating with the management platform and/or the user device) that provide information indicating routes traveled by the dump truck, quantities of material delivered by the dump truck, a weight of the dump truck, a time to deliver material by the dump truck, a quantity of material hauled per trip, and/or the like. In some implementations, the user device may receive the material delivery productivity information and may provide the information for display via a variety of user interfaces to the site foreman.

As further shown in FIG. 9, and by reference number 920, the user device may provide for display, to the site foreman, a user interface that provides a route traveled by a particular dump truck on the job site. For example, the route may indicate that the particular dump truck loaded stone at load zone A, traveled from load zone A to dump zone Z, dumped the stone at dump zone Z, and returned to load zone A, a number of times.

As further shown in FIG. 9, and by reference number 930, the user device may provide for display, to the site foreman, a user interface that provides, in real time, current dump counts at the dump zones of the job site. For example, the user interface may indicate that ten (10) loads of sand have been dumped at dump zone Y, and that ninety (90) more loads of sand are needed at dump zone Y. The user interface may also indicate that twenty-six (26) loads of stone have been dumped at dump zone Z, and that twenty-four (24) more loads of stone are needed at dump zone Z.

As further shown in FIG. 9, and by reference number 940, the user device may provide for display, to the site foreman, a user interface that provides material delivery productivity information for a particular dump truck on the job site. For example, the user interface may indicate that particular dump truck has spent 6.9% of the time period loading material, 43.2% of the time period dumping the material, 13.6% of the time period hauling the material, and 36.3% of the time period returning to a load zone for the material. The user interface may also indicate that the particular dump truck traveled a total distance of 3.8 miles over the time period, traveled at an average speed of 7.9 miles per hour (mph) over the time period, and has completed thirteen (13) material delivery cycles over the time period.

Figure 10:
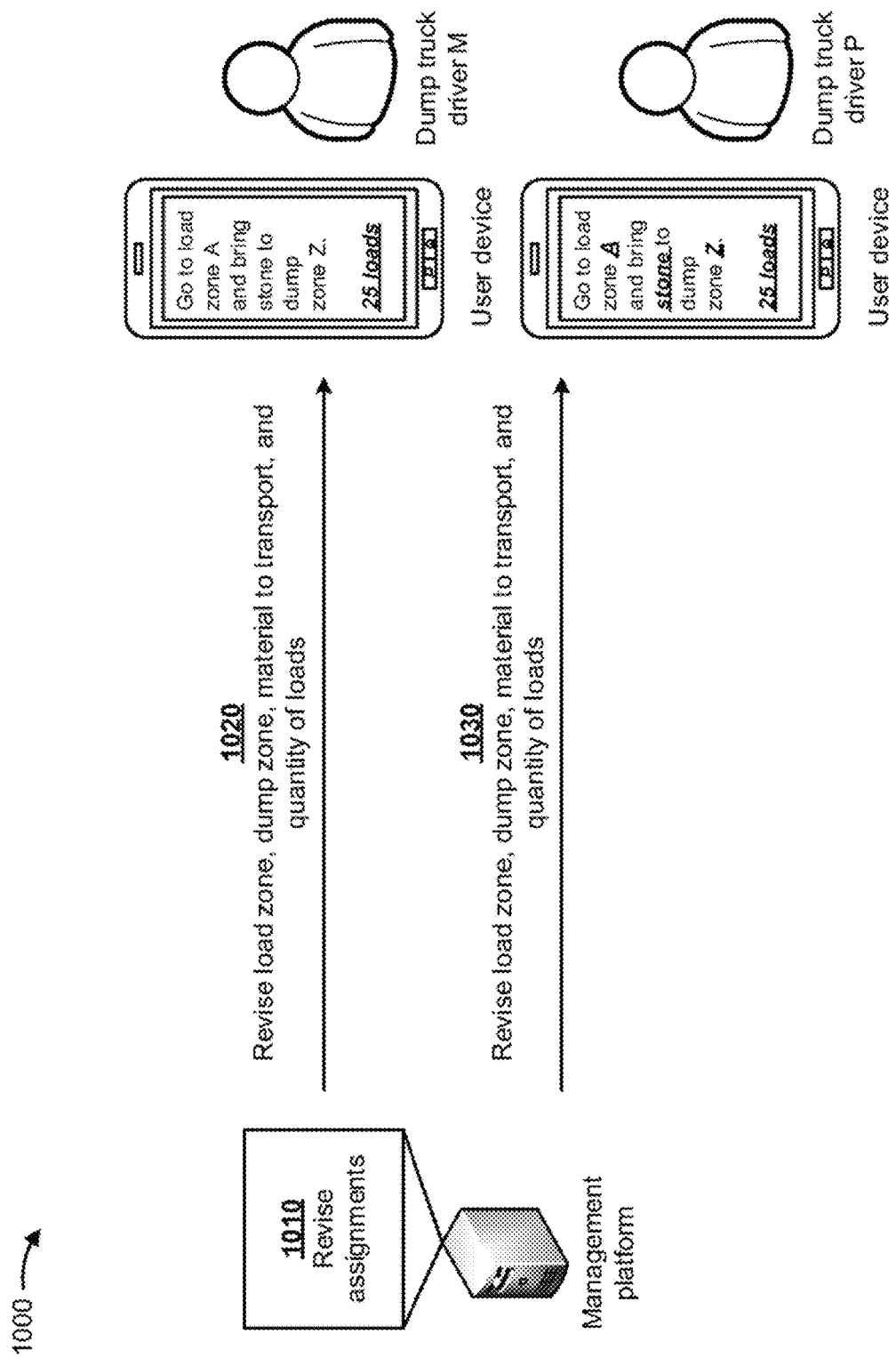

In some implementations, and with reference to example implementation 1000 of FIG. 10, the management platform may perform an action based on the dump count of the material and the quantity of material delivery cycles. For example, as shown by reference number 1010 in FIG. 10, the action performed by management platform may include revising assignments for the dump trucks. In such an example, and as shown by reference number 1020, the management platform may provide a revision to the load zone, the dump zone, the material to transport, and the quantity of loads to the user device associated with dump truck driver M. In the example, the revision may include requiring a lesser quantity of loads from dump truck driver M (e.g., reduced from 50 to 25 loads since dump truck driver M is behind in loads of stone).

As further shown in FIG. 10, and by reference number 1030, the management platform may provide a revision to the load zone, the dump zone, the material to transport, and the quantity of loads to the user device associated with dump truck driver P. In the example, the revision may include requiring a different load zone (e.g., load zone A), a different material (e.g., stone), a different dump zone (e.g., dump zone Z), and a quantity of loads from dump truck driver P (e.g., to help dump truck driver M who is behind in loads of stone).

In some implementations, the action performed by the management platform may include providing, to the user device associated with the site foreman, information identifying a dump count of a material and a quantity of material delivery cycles. In this way, the site foreman may track productivity of the dump trucks and may rate the dump truck drivers for future reference.

In some implementations, the action performed by the management platform may include providing, to the user device associated with the dump truck driver, one or more alerts associated with the dump count of the material or the quantity of material delivery cycles. In this way, the dump truck driver may track such information and may determine how much the dump truck driver will get paid. In some implementations, the management platform may control an excavator or a backhoe that provides the material to the dump truck. In such implementations, the management platform may know that a particular dump truck operates most efficiently with particular weight of material, and may instruct the excavator or backhoe to fill the dump with the particular weight.

As indicated above, FIGS. 1-10 are provided merely as examples. Other examples are possible and may differ from what was described with regard to FIGS. 1-10.

Figure 11:
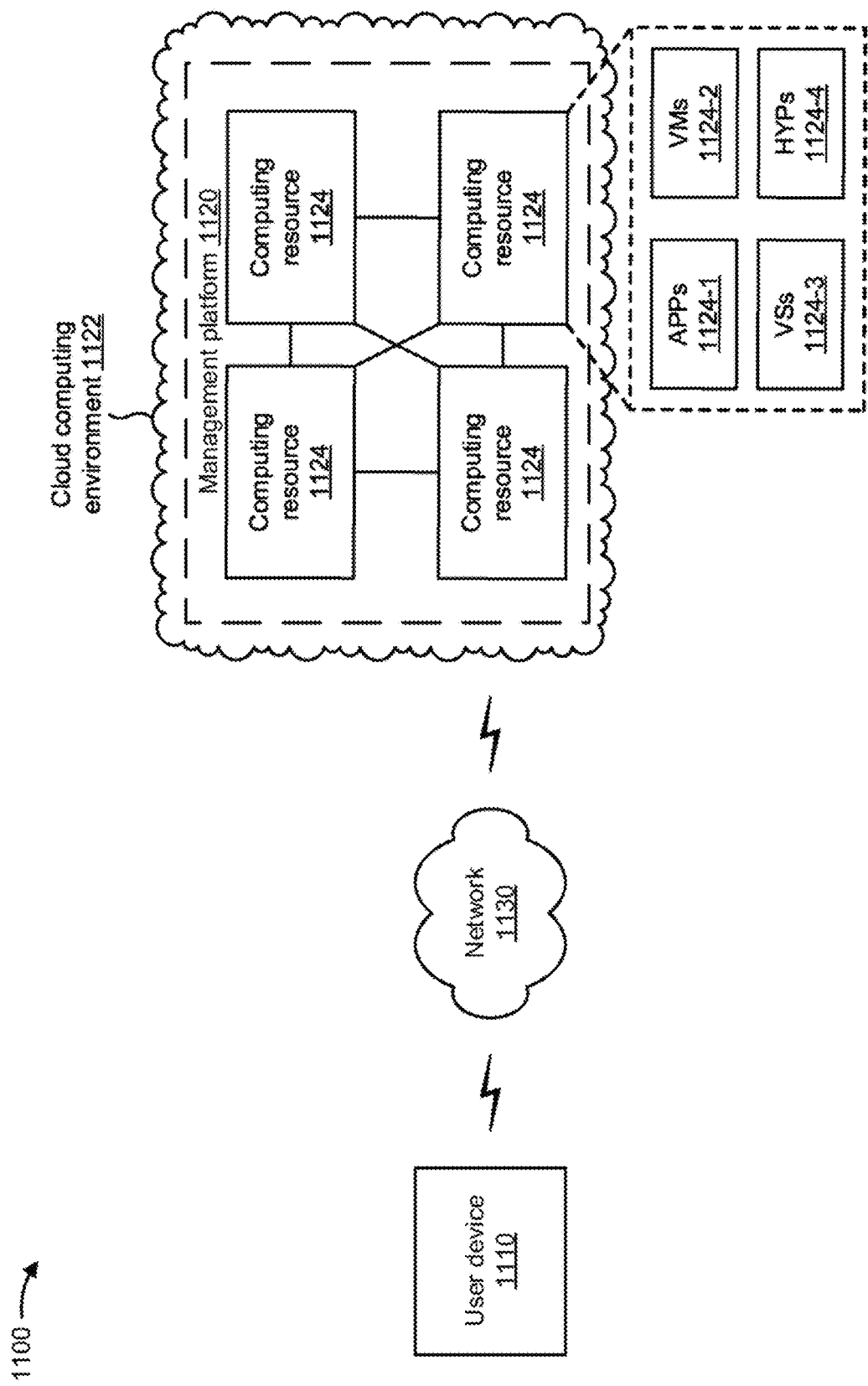
FIG. 11 is a diagram of an example environment in which systems and/or methods, described herein, may be implemented.

FIG. 11 is a diagram of an example environment 1100 in which systems and/or methods, described herein, may be implemented. As shown in FIG. 11, environment 1100 may include a user device 1110, a management platform 1120, and a network 1130. Devices of environment 1100 may interconnect via wired connections, wireless connections, or a combination of wired and wireless connections.

User device 1110 includes one or more devices capable of receiving, generating, storing, processing, and/or providing information, such as information described herein. For example, user device 1110 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 1110 may receive information from and/or transmit information to management platform 1120.

Management platform 1120 includes one or more devices that manage material delivery productivity associated with a machine (e.g., associated with user device 1110). In some implementations, management platform 1120 may be designed to be modular such that certain software components may be swapped in or out depending on a particular need. As such, management platform 1120 may be easily and/or quickly reconfigured for different uses. In some implementations, management platform 1120 may receive information from and/or transmit information to one or more user devices 1110.

In some implementations, as shown, management platform 1120 may be hosted in a cloud computing environment 1122. Notably, while implementations described herein describe management platform 1120 as being hosted in a cloud computing environment 1122, in some implementations, management platform 1120 may not be cloud-based (i.e., may be implemented outside of a cloud computing environment) or may be partially cloud-based.

Cloud computing environment 1122 includes an environment that hosts management platform 1120. Cloud computing environment 1122 may provide computation, software, data access, storage, etc. services that do not require end-user knowledge of a physical location and configuration of system(s) and/or device(s) that hosts management platform 1120. As shown, cloud computing environment 1122 may include a group of computing resources 1124 (referred to collectively as "computing resources 1124" and individually as "computing resource 1124").

Computing resource 1124 includes one or more personal computers, workstation computers, server devices, or other types of computation and/or communication devices. In some implementations, computing resource 1124 may host management platform 1120. Cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, and/or the like.

Application 1124-1 includes one or more software applications that may be provided to or accessed by user device 1110. Application 1124-1 may eliminate a need to install and execute the software applications on user device 1110. For example, application 1124-1 may include software associated with management platform 1120 and/or any other software capable of being provided via cloud computing environment 1122. In some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS"). A process virtual machine may execute a single program, and may support a single process. In some implementations, virtual machine 1124-2 may execute on behalf of a user (e.g., a user of user device 1110 or an operator of management platform 1120), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber opticbased network, and/or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

Figure 12:
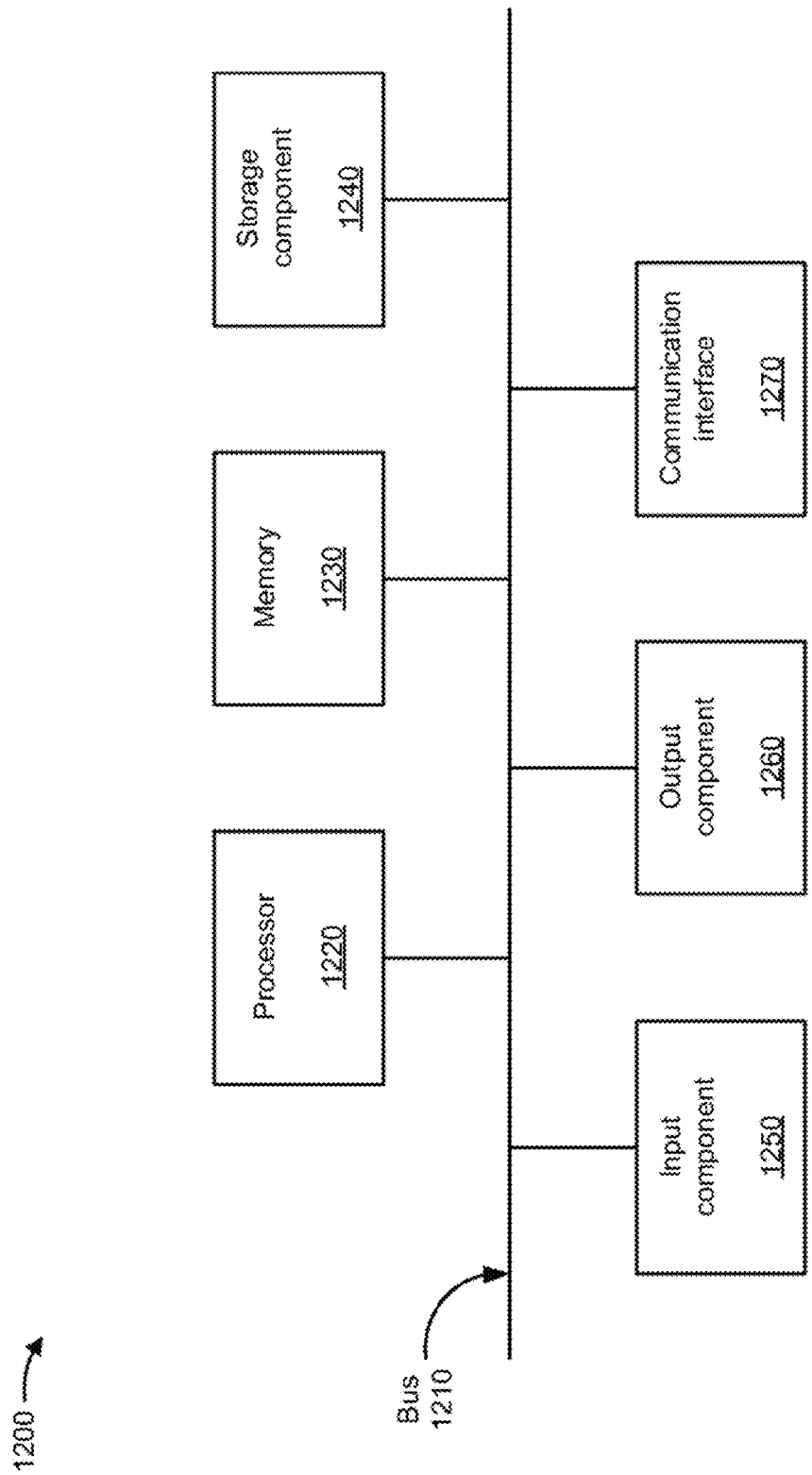
FIG. 12 is a diagram of example components of one or more devices of FIG. 11.

FIG. 12 is a diagram of example components of a device 1200. Device 1200 may correspond to user device 1110, management platform 1120, and/or computing resource 1124. In some implementations, user device 1110, management platform 1120, and/or computing resource 1124 may include one or more devices 1200 and/or one or more components of device 1200. As shown in FIG. 12, device 1200 may include a bus 1210, a processor 1220, a memory 1230, a storage component 1240, an input component 1250, an output component 1260, and a communication interface 1270.

Bus 1210 includes a component that permits communication among the components of device 1200. Processor 1220 is implemented in hardware, firmware, or a combination of hardware and software. Processor 1220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1220 includes one or more processors capable of being programmed to perform a function. Memory 1230 includes a random access memory (RAM), a read only memory (ROM), and/or another type of dynamic or static storage device (e.g., a flash memory, a magnetic memory, and/or an optical memory) that stores information and/or instructions for use by processor 1220.

Storage component 1240 stores information and/or software related to the operation and use of device 1200. For example, storage component 1240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1250 includes a component that permits device 1200 to receive information, such as via user input (e.g., a touch screen display, a keyboard, a keypad, a mouse, a button, a switch, and/or a microphone). Additionally, or alternatively, input component 1250 may include a sensor for sensing information (e.g., a global positioning system (GPS) component, an accelerometer, a gyroscope, and/or an actuator). Output component 1260 includes a component that provides output information from device 1200 (e.g., a display, a speaker, and/or one or more light-emitting diodes (LEDs)).

Communication interface 1270 includes a transceiver-like component (e.g., a transceiver and/or a separate receiver and transmitter) that enables device 1200 to communicate with other devices, such as via a wired connection, a wireless connection, or a combination of wired and wireless connections. Communication interface 1270 may permit device 1200 to receive information from another device and/or provide information to another device. For example, communication interface 1270 may include an Ethernet interface, an optical interface, a coaxial interface, an infrared interface, a radio frequency (RF) interface, a universal serial bus (USB) interface, a Wi-Fi interface, a cellular network interface, and/or the like.

Device 1200 may perform one or more processes described herein. Device 1200 may perform these processes based on processor 1220 executing software instructions stored by a non-transitory computer-readable medium, such as memory 1230 and/or storage component 1240. A computer-readable medium is defined herein as a non-transitory memory device. A memory device includes memory space within a single physical storage device or memory space spread across multiple physical storage devices.

Software instructions may be read into memory 1230 and/or storage component 1240 from another computer-readable medium or from another device via communication interface 1270. When executed, software instructions stored in memory 1230 and/or storage component 1240 may cause processor 1220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 12 are provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

FIG. 13 is a flow chart of an example process 1300 for managing material delivery productivity. In some implementations, one or more process blocks of FIG. 13 may be performed by a management platform (e.g., management platform 1120). In some implementations, one or more process blocks of FIG. 13 may be performed by another device or a group of devices separate from or including management platform 1120, such as user device 1110.

As shown in FIG. 13, process 1300 may include receiving information identifying a job site, a load zone, a dump zone, a quantity of loads, and a material for the zones (block 1310). For example, the management platform (e.g., using computing resource 1124, processor 1220, communication interface 1270, and/or the like) may receive information identifying a job site, a load zone, a dump zone, a quantity of loads, and a material for the zones, as described above in connection with FIGS. 1-11.

As further shown in FIG. 13, process 1300 may include identifying a machine, from multiple machines, to assign to the load zone, the dump zone, the quantity of loads, and the material (block 1320). For example, the management platform (e.g., using computing resource 1124, processor 1220, storage component 1240, and/or the like) may identify a machine, from multiple machines, to assign to the load zone, the dump zone, the quantity of loads, and the material, as described above in connection with FIGS. 1-11.

As further shown in FIG. 13, process 1300 may include providing, to a user device associated with the machine, information indicating that the load zone, the dump zone, the quantity of loads, and the material are assigned to the machine (block 1330). For example, the management platform (e.g., using computing resource 1124, processor 1220, communication interface 1270, and/or the like) may provide, to a user device associated with the machine, information indicating that the load zone, the dump zone, the quantity of loads, and the material are assigned to the machine, as described above in connection with FIGS. 1-11.

As further shown in FIG. 13, process 1300 may include receiving, from the user device and over a time period, location information associated with the user device and the machine (block 1340). For example, the management platform (e.g., using computing resource 1124, processor 1220, communication interface 1270, and/or the like) may receive, from the user device and over a time period, location information associated with the user device and the machine, as described above in connection with FIGS. 1-11.

As further shown in FIG. 13, process 1300 may include determining statuses of the machine over the time period and based on the location information (block 1350). For example, the management platform (e.g., using computing resource 1124, processor 1220, storage component 1240, and/or the like) may determine statuses of the machine over the time period and based on the location information, as described above in connection with FIGS. 1-11.

As further shown in FIG. 13, process 1300 may include calculating a dump count of the material, for the machine and at a particular time, based on the statuses of the machine (block 1360). For example, the management platform (e.g., using computing resource 1124, processor 1220, memory 1230, and/or the like) may calculate a dump count of the material, for the machine and at a particular time, based on the statuses of the machine, as described above in connection with FIGS. 1-11.

As further shown in FIG. 13, process 1300 may include calculate a quantity of material delivery cycles, for the machine and at the particular time, based on the statuses of the machine (block 1370). For example, the management platform (e.g., using computing resource 1124, processor 1220, storage component 1240, and/or the like) may calculate a quantity of material delivery cycles, for the machine and at the particular time, based on the statuses of the machine, as described above in connection with FIGS. 1-11.

As further shown in FIG. 13, process 1300 may include performing an action based on the dump count of the material and the quantity of material delivery cycles (block 1380). For example, the management platform (e.g., using computing resource 1124, processor 1220, memory 1230, communication interface 1270, and/or the like) may perform an action based on the dump count of the material and the quantity of material delivery cycles, as described above in connection with FIGS. 1-11.

Process 1300 may include additional implementations, such as any single implementation or any combination of implementations described below and/or described with regard to any other process described herein.

In some implementations, the information identifying the load zone of the job site and the dump zone of the job site may be provided via geographical boundaries that are input to a user interface displaying a visual rendering of the job site. In some implementations, the management platform may provide, to a user device associated with a foreman of the job site, information identifying the dump count of the material and the quantity of material delivery cycles, may provide, to a user device associated with the machine, an update to the information indicating that the load zone, the dump zone, the quantity of loads, and the material are assigned to the machine, and/or may provide, to a user device associated with another machine, information indicating that the load zone, the dump zone, a portion of the quantity of loads, and the material are assigned to the other machine.

In some implementations, the management platform may determine, based on the statuses of the machine, a first quantity of times the machine is located at or near the load zone, may determine, based on the statuses of the machine, a second quantity of times the machine is located between the load zone and the dump zone, may determine, based on the statuses of the machine, a third quantity of times the machine is located at or near the dump zone, and may calculate the dump count of the material based on the first quantity of times, the second quantity of times, and the third quantity of times.

In some implementations, the management platform may determine, based on the statuses of the machine, a first quantity of times the machine is located at or near the load zone, may determine, based on the statuses of the machine, a second quantity of times the machine is traveling from the load zone to the dump zone, may determine, based on the statuses of the machine, a third quantity of times the machine is located at or near the dump zone, may determine, based on the statuses of the machine, a fourth quantity of times the machine is traveling from the dump zone to the load zone, and may calculate the quantity of material delivery cycles based on the first quantity of times, the second quantity of times, the third quantity of times, and the fourth quantity of times.

In some implementations, the management platform may identify the machine based on the information identifying the job site, the load zone, the dump zone, the quantity of loads, and the material, and may provide, to the user device, the information indicating that the load zone, the dump zone, the quantity of loads, and the material are assigned to the machine, based on identifying the machine. In some implementations, the machine may include a dump truck.

In some implementations, the action may include one or more of providing, to the first user device or the second user device, information identifying the dump count of the material and the quantity of material delivery cycles, providing, to the first user device, one or more alerts associated with the dump count of the material or the quantity of material delivery cycles, providing, to the second user device, an update to the information indicating that the load zone, the dump zone, the quantity of loads, and the material are assigned to the machine, and/or providing, to a third user device associated with another machine, information indicating that the load zone, the dump zone, a portion of the quantity of loads, and the material are assigned to the other machine.

In some implementations, the information identifying the load zone of the job site may be determined based on a location of a loader machine on the job site, and the information identifying the dump zone of the job site may be provided via geographical boundaries that are input to a user interface displaying a visual representation of the job site. In some implementations, the management platform may determine, based on the statuses of the machine, a quantity of times that the machine is located at or near the load zone, then is located between the load zone and the dump zone, and then is located at or near the dump zone, and may calculate the dump count of the material based on the quantity of times.

In some implementations, the management platform may determine, based on the statuses of the machine, a quantity of times that the machine is located at or near the load zone, then is traveling from the load zone to the dump zone, then is located at or near the dump zone, and then is traveling from the dump zone to the load zone, and may calculate the quantity of material delivery cycles based on the quantity of times.

In some implementations, the statuses of the machine may indicate that the machine is at or near the load zone when the machine is located within a first distance of the load zone for a first amount of time, that the machine is traveling from the load zone to the dump zone when the machine is located greater than the first distance from the load zone for a second amount of time after the first amount of time, that the machine is at or near the dump zone when the machine is located within a second distance of the dump zone for a third amount of time, and/or that the machine is traveling from the dump zone to the load zone when the machine is located greater than the second distance from the dump zone for a fourth amount of time after the third amount of time.

In some implementations, the management platform may monitor the job site based on the statuses of the machine and based on statuses of another machine on the job site, may generate one or more alerts based on monitoring the job site, and may provide the one or more alerts to the first user device. In some implementations, the management platform may monitor the job site based on the statuses of the machine, may generate material delivery productivity information based on monitoring the job site, and may provide the material delivery productivity information to another user device associated with a foreman of the job site.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

INDUSTRIAL APPLICABILITY

Management platform 1120 may be used to manage material delivery productivity. In some implementations, management platform 1120 may receive information identifying a job site, a load zone of the job site, a dump zone of the job site, a quantity of loads, and a material for the load zone and the dump zone. Management platform 1120 may identify a machine, from multiple machines available for the job site, to assign to the load zone, the dump zone, the quantity of loads, and the material, and may provide, to a user device associated with the machine, information indicating that the load zone, the dump zone, the quantity of loads, and the material are assigned to the machine. Management platform 1120 may receive, from the user device and over a time period, location information associated with the user device and the machine, and may determine statuses of the machine over the time period and based on the location information. Management platform 1120 may calculate a dump count of the material, for the machine and at a particular time, based on the statuses of the machine, and may calculate a quantity of material delivery cycles, for the machine and at the particular time, based on the statuses of the machine. Management platform 1120 may perform an action based on the dump count of the material and the quantity of material delivery cycles.

In this way, several different stages of the process for managing material delivery productivity are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, current systems require utilizing expensive and difficult to use telemetry hardware (e.g., embedded or retrofit in a machine) to track materials. Finally, automating the process for managing material delivery productivity conserves computing resources (e.g., processing resources, memory resources, and/or the like) that would otherwise be wasted in attempting to manage material delivery productivity.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:
1. A device comprising:
one or more memory devices; and
one or more processors, operatively coupled to the one or more memory devices, to:
  receive information identifying a job site, a load zone of the job site, a dump zone of the job site, a quantity of loads, and a material associated with the load zone and the dump zone;
  provide, to a user device associated with a machine, information indicating that the load zone, the dump zone, the quantity of loads, and the material are assigned to the machine;
  receive, from the user device and over a time period, location information associated with the user device and the machine;
  determine statuses of the machine over the time period and based on the location information;
  calculate a dump count of the material, for the machine and at a particular time, based on the statuses of the machine;
  calculate a quantity of material delivery cycles, for the machine and at the particular time, based on the statuses of the machine,
    wherein the one or more processors, when calculating the quantity of material delivery cycles, are to:
      determine, based on the statuses of the machine, a first quantity of times the machine is located at or near the load zone;
      determine, based on the statuses of the machine, a second quantity of times the machine is traveling from the load zone to the dump zone;

determine, based on the statuses of the machine, a third quantity of times the machine is located at or near the dump zone;
determine, based on the statuses of the machine, a fourth quantity of times the machine is traveling from the dump zone to the load zone; and
calculate the quantity of material delivery cycles based on the first quantity of times, the second quantity of times, the third quantity of times, and the fourth quantity of times; and
perform an action based on the dump count of the material and the quantity of material delivery cycles, wherein the user device is a first user device, and wherein, when performing the action, the one or more processors are to one or more of:
provide, to a second user device, information identifying the dump count of the material and the quantity of material delivery cycles,
provide, to the first user device, an update to the information indicating that the load zone, the dump zone, the quantity of loads, and the material are assigned to the machine, or
provide, to a third user device associated with another machine, information indicating that the load zone, the dump zone, a portion of the quantity of loads, and the material are assigned to the other machine.

2. The device of claim 1, wherein the information identifying the load zone of the job site and the dump zone of the job site is provided via geographical boundaries that are input to a user interface displaying a visual rendering of the job site.

3. The device of claim 1, wherein the one or more processors, when calculating the dump count of the material, are to:
calculate the dump count of the material based on the first quantity of times.

4. The device of claim 1, wherein the one or more processors are further to:
identify the machine based on the information identifying the job site, the load zone, the dump zone, the quantity of loads, and the material, and
wherein the one or more processors, when providing the information indicating that the load zone, the dump zone, the quantity of loads, and the material are assigned to the machine, are to:
provide, to the user device, the information indicating that the load zone, the dump zone, the quantity of loads, and the material are assigned to the machine, based on identifying the machine.

5. The device of claim 1, wherein the machine includes a dump truck.

6. The device of claim 1,
wherein a status, of the statuses of the machine, is determined based on the location information indicating that a location of the machine is within a particular distance of a particular zone corresponding to the status, and
wherein the particular zone is the load zone or the dump zone.

7. The device of claim 1, wherein at least one of the load zone or the dump zone is defined via a user interface.

8. A non-transitory computer-readable medium storing instructions, the instructions comprising:
one or more instructions that, when executed by one or more processors of a device, cause the one or more processors to:
receive, from a first user device, information identifying a job site, a load zone of the job site, a dump zone of the job site, a quantity of loads, and a material associated with the load zone and the dump zone;
identify a machine, from a plurality of machines, to assign to the load zone, the dump zone, the quantity of loads, and the material, based on information associated with the plurality of machines;
provide, to a second user device associated with the machine, and based on the information identifying the machine, information indicating that the load zone, the dump zone, the quantity of loads, and the material are assigned to the machine;
receive, from the second user device and over a time period, location information associated with the second user device and the machine;
determine statuses of the machine over the time period and based on the location information;
calculate a dump count of the material, for the machine and at a particular time, based on the statuses of the machine;
calculate a quantity of material delivery cycles, for the machine and at the particular time, based on the statuses of the machine,
wherein the one or more instructions, that cause the one or more processors to calculate the quantity of material delivery cycles, cause the one or more processors to:
determine, based on the statuses of the machine, a first quantity of times the machine is located at or near the load zone;
determine, based on the statuses of the machine, a second quantity of times the machine is traveling from the load zone to the dump zone;
determine, based on the statuses of the machine, a third quantity of times the machine is located at or near the dump zone;
determine, based on the statuses of the machine, a fourth quantity of times the machine is traveling from the dump zone to the load zone; and
calculate the quantity of material delivery cycles based on the first quantity of times, the second quantity of times, the third quantity of times, and the fourth quantity of times; and
perform an action based on the dump count of the material and the quantity of material delivery cycles, wherein the action includes one or more of:
providing, to the first user device or the second user device, information identifying the dump count of the material and the quantity of material delivery cycles,
providing, to the second user device, an update to the information indicating that the load zone, the dump zone, the quantity of loads, and the material are assigned to the machine, or
providing, to a third user device associated with another machine, information indicating that the load zone, the dump zone, a portion of the quantity of loads, and the material are assigned to the other machine.

9. The non-transitory computer-readable medium of claim 8, wherein the action further includes:
providing, to the first user device, one or more alerts associated with the dump count of the material or the quantity of material delivery cycles.

10. The non-transitory computer-readable medium of claim 8, wherein the information identifying the load zone of the job site is determined based on a location of a loader machine on the job site, and
  wherein the information identifying the dump zone of the job site is provided via geographical boundaries that are input to a user interface displaying a visual representation of the job site.

11. The non-transitory computer-readable medium of claim 8, wherein the one or more instructions, that cause the one or more processors to calculate the dump count of the material, cause the one or more processors to:
  determine, based on the statuses of the machine, a quantity of times that the machine is located at or near the load zone, then is located between the load zone and the dump zone, and then is located at or near the dump zone; and
  calculate the dump count of the material based on the quantity of times.

12. The non-transitory computer-readable medium of claim 8, wherein the statuses of the machine indicate one or more of:
  that the machine is at or near the load zone when the machine is located within a first distance of the load zone for a first amount of time,
  that the machine is traveling from the load zone to the dump zone when the machine is located greater than the first distance from the load zone for a second amount of time after the first amount of time,
  that the machine is at or near the dump zone when the machine is located within a second distance of the dump zone for a third amount of time, or
  that the machine is traveling from the dump zone to the load zone when the machine is located greater than the second distance from the dump zone for a fourth amount of time after the third amount of time.

13. The non-transitory computer-readable medium of claim 8, further comprising:
  one or more instructions that, when executed by the one or more processors, cause the one or more processors to:
    monitor the job site based on the statuses of the machine and based on statuses of another machine on the job site;
    generate one or more alerts based on monitoring the job site; and
    provide the one or more alerts to the first user device.

14. The non-transitory computer-readable medium of claim 8,
  wherein a status, of the statuses of the machine, is determined based on the location information indicating that a location of the machine is within a particular distance of a particular zone corresponding to the status, and
  wherein the particular zone is the load zone or the dump zone.

15. The non-transitory computer-readable medium of claim 8, wherein at least one of the load zone or the dump zone is defined via a user interface.

16. A method comprising:
  receiving, by a device, information identifying a job site, a load zone of the job site, a dump zone of the job site, a quantity of loads, and a material associated with the load zone and the dump zone;
  identifying, by the device, a machine from a plurality of machines available for the job site, based on information about the plurality of machines, information about drivers of the plurality of machines, information about a geographical area in which the load zone and the dump zone are located, or information about a condition associated with the geographical area;
  providing, by the device and to a user device associated with the machine, information indicating that the load zone, the dump zone, the quantity of loads, and the material are assigned to the machine;
  receiving, by the device, from the user device, and over a time period, location information associated with the user device and the machine;
  determining, by the device, statuses of the machine over the time period and based on the location information;
  calculating, by the device, a dump count of the material, for the machine and at a particular time, based on the statuses of the machine;
  calculating, by the device, a quantity of material delivery cycles, for the machine and at the particular time, based on the statuses of the machine,
    wherein calculating the quantity of material delivery cycles comprises:
      determining, based on the statuses of the machine, a first quantity of times the machine is located at or near the load zone;
      determining, based on the statuses of the machine, a second quantity of times the machine is traveling from the load zone to the dump zone;
      determining, based on the statuses of the machine, a third quantity of times the machine is located at or near the dump zone;
      determining, based on the statuses of the machine, a fourth quantity of times the machine is traveling from the dump zone to the load zone; and
      calculating the quantity of material delivery cycles based on the first quantity of times, the second quantity of times, the third quantity of times, and the fourth quantity of times and
  performing, by the device, an action based on the dump count of the material,
    wherein the user device is a first user device, and
    wherein performing the action comprises one or more of:
      providing, to a second user device, information identifying the dump count of the material,
      providing, to the first user device, an update to the information indicating that the load zone, the dump zone, the quantity of loads, and the material are assigned to the machine, or
      providing, to a third user device associated with another machine, information indicating that the load zone, the dump zone, a portion of the quantity of loads, and the material are assigned to the other machine.

17. The method of claim 16, wherein calculating the dump count of the material comprises:
  calculating the dump count of the material based on the first quantity of times.

18. The method of claim 16, wherein the statuses of the machine indicate one or more of:
  that the machine is loading the material at the load zone when the machine is located within a first distance of the load zone for a first amount of time,
  that the machine is hauling the material from the load zone to the dump zone when the machine is located greater than the first distance from the load zone for a second amount of time after the first amount of time, that the machine is dumping the material at the dump zone when the machine is located within a second distance of the dump zone for a third amount of time, or that the machine is returning from the dump zone to the load zone when the machine is located greater than the second distance from the dump zone for a fourth amount of time after the third amount of time.

19. The method of claim 16, further comprising:

monitoring the job site based on the statuses of the machine;

generating material delivery productivity information based on monitoring the job site; and providing the material delivery productivity information to another user device.

20. The method of claim 16, wherein a status, of the statuses of the machine, is determined based on the location information indicating that a location of the machine is within a particular distance of a particular zone corresponding to the status, and wherein the particular zone is the load zone or the dump zone.

\* \* \* \* \*